Oct. 30, 1956 AN WANG 2,769,163

SYNCHRONIZER

Filed Aug. 13, 1953

INVENTOR
AN WANG
BY Joseph Weingarten
ATTORNEY

United States Patent Office 2,769,163

Patented Oct. 30, 1956

2,769,163

SYNCHRONIZER

An Wang, Cambridge, Mass., assignor to Laboratory For Electronics, Inc., Boston, Mass., a corporation of Delaware Application August 13, 1953, Serial No. 374,099

9 Claims. (Cl. 340—174)

The present invention relates in general to electrical data systems and more particularly concerns apparatus for reliably establishing a predetermined timing relationship between initially unrelated electrical signals with a minimum of commercially available dependable electronic components. Circuits performing this general function have become known in the art as synchronizers and are gaining extensive use in computers and other data processing and interpretation equipment.

Fundamentally, a synchronizer circuit is a device to which random data, as, for example, in the form of a pulse train of irregular, aperiodic time separation, is applied together with a timing pulse train of periodic or other waveform of desired time sequence. In operation, the synchronizer yields for each data pulse an output pulse occurring in time coincidence with a timing pulse. It is not necessary that a data pulse be applied for each timing pulse. Thus, many timing pulses may occur in an interval prior to the application of a data pulse, but when a data pulse is received, the synchronizer will deliver an output pulse in time coincidence with the next succeeding timing pulse.

Functionally, the synchronizer must be capable of accepting and briefly storing each data pulse for subsequent release by a timing pulse. Numerous storage systems exist which are well-suited for such purposes. Since no more than a single pulse need be stored at any instant of time, one bistable element, such as an electron tube flip-flop, is sufficient. For instance, consider a flip-flop set to one stable state by a data pulse and re-set to the other by a timing pulse. A pulse output may be derived by differentiating the flip-flop square wave. To a certain extent, this output is synchronized, but difficulties are at once encountered if application is attempted in equipment where precise, quantitative data are essential, primarily because the circuit of this elementary example fails to take into account the possibility of the simultaneous occurrence of random and timing pulses. The operation of flip-flops, or for that matter, other bistable circuits or components, are highly erratic under such circumstances so that an unpredictable error would appear in the system output.

Complex electronic control systems have been proposed as means to overcome these synchronizer inadequacies. Although successful in principle, they have materially enlarged the chances of system breakdown due to component failure and have had the further disadvantage of increasing circuit weight and space requirements.

The present invention contemplates and has as a primary object the provision of a synchronizer capable of continuously furnishing an unambiguous, precisely synchronized output through the novel utilization of a bistable magnetic memory component in an electron tube control circuit. It is another object of this invention to provide a synchronizer embodying magnetic techniques and arranged positively to preclude error or ambiguity when activated by simultaneous or overlapping random data and timing signals.

Other objects and advantages of the present invention will become apparent from the following detailed specification when taken in connection with the drawing in which.

Figure 1:
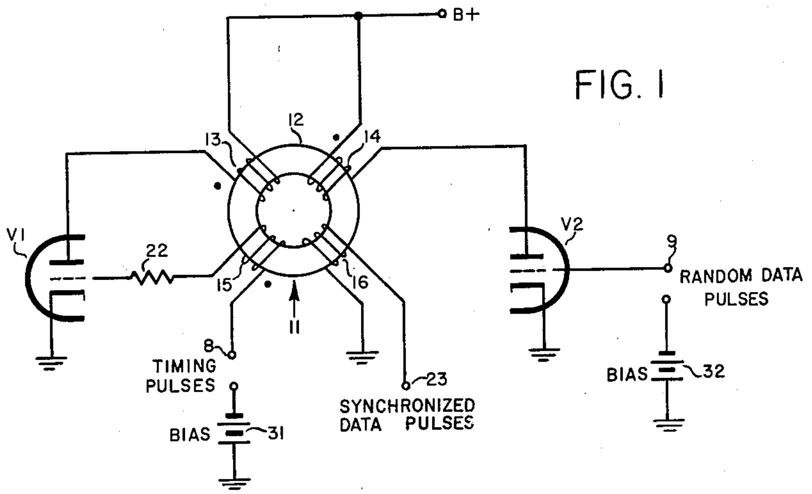
Fig. 1 is a schematic circuit diagram of the synchronizer circuit.
Figure 2:
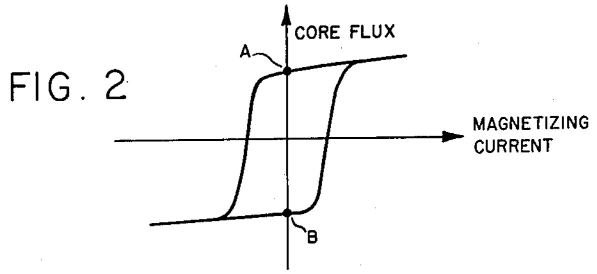
Fig. 2 is a graphical representation of the hysteresis characteristic of the magnetic material embodied in the circuit of Fig. 1.

With reference now to the drawing, and more particularly to Fig. 1 thereof, the synchronizer circuit, which accepts timing pulses at terminal 8 and random data pulses at terminal 9, is seen to comprise a static magnetic memory component 11 operatively associated with a pair of triode electron tube sections V1 and V2. Magnetic component 11 is formed of a toroidal core 12, preferably a ferrite (ferromagnetic ceramic) characterized by a substantially rectangular hysteresis loop having two stable residual flux states A and B, as generally pictured in Fig. 2.

Four coils are wound upon magnetic core 12. Of these, coils 13 and 14 connect the plates of triodes V1 and V2 respectively to a positive power source B+. Coil 15 couples timing pulse input terminal 8 to the control grid of tube V1 through a relatively small oscillation damping resistor 22, while data pulses are directly applied to the control grid of tube V2. Coil 16 provides, at terminal 23, the synchronized signal output. These relative polarities are indicated on the drawing by the conventional dot symbolism.

The tube cathodes are grounded, and suitable negative supplies 31 and 32 are used to bias both triodes slightly beyond cut-off in the absence of input signals.

In operation, a positive random data pulse at terminal 9 momentarily overcomes the cut-off bias of tube V2 and pulses magnetic core 12 through coil 14. Magnetic core 12 is thereby set to one stable residual flux state. The next succeeding positive timing pulse appearing at input terminal 8 drives tube V1 into conduction and hence pulses core 12 through coil 13. Coils 13 and 14 are arranged for opposite effect, whereby the timing pulse reverses the residual flux in core 12, simultaneously inducing an output synchronized data pulse in coil 16 for application to terminal 23. This flux reversal is accelerated by the regenerative effect of coil 15.

Further timing pulses arriving prior to the receipt of the next random data pulse are without effect because, although tube V1 is pulsed, saturation of core 12 precludes flux change and the generation of additional output pulses. The next following random data pulse, however, reverses the residual flux in core 12, so that an output pulse is again generated by the succeeding timing pulse.

Evidently, each random data pulse in setting the residual flux in core 12 will provide a pulse at terminal 23; however, these pulses are of opposite polarity to those generated when the core flux is reversed by a timing pulse, and may, if desired, be short-circuited by a suitably poled crystal diode (not shown) connected between terminal 23 and ground. The output pulses of concern here are those which are produced when a timing pulse reverses the core flux. The end of coil 16 connected to terminal 23 is selected to yield the desired polarity for the equipment to which the synchronizer is ultimately connected. Unwanted pulses of opposite polarity have been disregarded in the discussion which follows.

Figure 3:
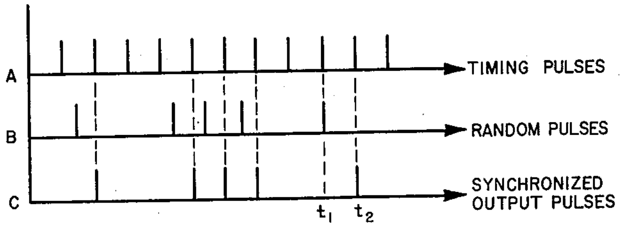
Fig. 3 is a graphical representation of timing relationships achieved with the synchronizer of Fig. 1.

In Fig. 3, there is illustrated on a common time scale, the relationship of pulses exemplifying operation of the synchronizer of Fig. 1. Periodic timing pulses are shown in Fig. 3(A), and randomly occurring data pulses are shown in Fig. 3(B). It will be noted that the synchronized output pulses, shown in Fig. 3(C), occur at a time subsequent to each data pulse but in time synchronism with the next succeeding timing pulse.

The critical condition of simultaneous occurrence of a timing pulse and a random data pulse is shown at time $t_1$, and for an explanation of the operation of the synchronizer under such circumstances, reference is once again made to Fig. 1. Timing pulses reach the grid of tube V1 through series coil 15. Each random data pulse applied to terminal 9 in changing the residual flux state in core 12 induces a relatively large negative potential in coil 15, applied to the grid of tube V1, which is arranged by virtue of an appropriate turns ratio, to be of greater magnitude than the maximum magnitude of timing pulses applied to terminal 8. By making the magnetizing force of coil 14 greater than that of coil 13, no chance of error exists. For example, if the number of turns on coil 14 is twice that on coil 13, and the currents therethrough are substantially equal, a timing pulse cannot cause conduction in tube V1 during the simultaneous application of a data pulse. Consequently, it is the data pulse which always controls the establishment of a flux condition in core 12.

Again with reference to time $t_1$ in Fig. 3, the simultaneous application of pulses does not yield a synchronized output pulse at that instant, but appropriately sets the core flux. The next succeeding timing pulse at time $t_2$ re-sets the core and produces the synchronized data output pulse.

From the above discussion, and with particular reference to the timing diagram of Fig. 3, it is apparent that a limitation exists as to the relative frequencies acceptable at synchronizer terminals 8 and 9. Thus, the period between random pulses must be greater than the period between timing pulses. Were two random data pulses to occur in the interval between two timing pulses, the second of these data pulses would be lost due to the absence of an intermediate flux reversing pulse.

The overall structural simplicity of the novel synchronizer is at once evident from inspection of Fig. 1. But stemming from the absence of complex circuitry is an unusual degree of reliability and versatility. As a practical example, a synchronizer utilizing this circuit with a 12AU7 twin-triode and a magnetic core unit approximately five eighths inch in diameter, where coils 13, 14 and 15 were wound with 300, 600 and 150 turns, respectively, successfully synchronized random pulses with respect to timing pulses up to frequencies of 50 kilocycles per second. With an input signal of approximately 4 microseconds duration and 30 volts peak, output pulses of 22 volts and of approximately 5 microseconds duration were obtained. The positive supply potential was 150 volts and a negative cut-off bias of 12 volts was used, and minor variations in these potentials were without adverse effect. With fewer turns and higher currents, synchronism at higher frequencies may readily be achieved.

Throughout the above discussion, the input signals have been referred to as data and timing "pulses." However, by virtue of the unique characteristics of the square-loop magnetic cores, it is unnecessary to so limit the input waveforms. Sinusoidal or square waves may, for example, be applied at either input. Since the output signal is developed essentially by virtue of a rapid flux-switching phenomenon, it is essentially a pulse waveform, irrespective of the particular signal form.

The circuit discussed is operative substantially independent of tube type. Power requirements are extremely low inasmuch as the triode sections are normally cut-off, and conduct only during the brief application of pulses. Further, at any instant, only one of the two tube sections may be conducting.

Since numerous modifications and departures may now be made by those skilled in this electrical art, the invention herein is to be construed as limited only by the spirit and scope of the appended claims.

What is claimed is:

1. Apparatus for synchronously relating first and second electrical signals comprising, a bistable magnetic memory component characterized by a substantially rectangular hysteresis loop, first and second windings disposed upon said magnetic component, means for applying said first electrical signal to said first winding for establishing a first stable residual flux condition in said magnetic component, means for applying said second electrical signal to said second winding for reversing the flux condition in said magnetic component and establishing a second stable residual flux condition therein, and a third winding disposed upon said magnetic component and arranged to preclude application of said second electrical signal to said second winding during a period of application to said first winding of said first electrical signal.

2. Apparatus as in claim 1 and including a fourth winding disposed on said magnetic component and responsive to reversal of said flux condition from said first to said second stable state for generating an output synchronized signal.

3. Apparatus for providing an output synchronized signal pulse for each pulse in a first applied electrical pulse train in time coincidence with the occurrence of a pulse in a second electrical pulse train comprising, a magnetic memory component formed of a toroidal magnetic core characterized by a substantially rectangular hysteresis loop with first and second stable residual flux states, first, second and third windings disposed on said magnetic core, means for applying each of said first electrical pulses to said first winding for setting said magnetic core in said first residual flux state, means for applying each of said second electrical pulses to said second winding for setting said magnetic core into said second stable state, and means including said third winding for precluding the application to said second winding of pulses in said second pulse train occurring in time coincidence with pulses in said first electrical pulse train.

4. Apparatus as in claim 3 and including a fourth winding on said magnetic core responsive to residual flux reversal from said first to said second state for generating an output signal pulse, whereby each output pulse occurs in time coincidence with a pulse in said second signal.

5. A synchronizer comprising, a static magnetic memory component formed of a toroidal magnetic core characterized by a substantially rectangular hysteresis loop with first and second stable residual flux states, first and second electron tubes each having input and output circuits, first and second magnetically opposed windings disposed on said toroidal core and respectively connected in the output circuits of said first and second electron tubes, bias means normally cutting-off said first and second electron tubes, means for applying unsynchronized electrical pulses to the input circuit of said first electron tube for overcoming said bias and initiating conduction therein, means for applying timing pulses having a period less than the minimum period between said unsynchronized pulses to said input circuit of said second electron tube for initiating conduction therein, and a third winding disposed on said toroidal core and connected to the input circuit of said second electron tube whereby conduction in said second electron tube is precluded during the simultaneous application of pulses to the inputs of said first and second electron tubes.

6. Apparatus as in claim 5 and including a fourth winding disposed upon said toroidal core for providing a synchronized output pulse during reversal of said residual core flux under the influence of a pulse applied to the input of said second electron tube.

7. Apparatus as in claim 5 wherein said first winding is arranged to provide greater magnetizing force in said toroidal core than said second winding.

8. Apparatus for synchronizing first and second electrical signals comprising, a bistable magnetic memory component, means responsive to the application of said first electrical signal for establishing a stable residual flux condition in said magnetic component, means responsive to the application of said second electrical signal for substantially instantaneously establishing a reversed stable residual flux condition in said magnetic component, means actuated by flux reversal in said magnetic component for generating an output synchronized signal, and means operative during the establishment of said first-mentioned stable residual flux condition for precluding simultaneous response of said magnetic component to said second electrical signal.

9. A synchronizer comprising, a static magnetic memory component formed of a toroidal magnetic core characterized by a substantially rectangular hysteresis loop with first and second stable residual flux states, first and second electron tubes each having input and output circuits, first and second magnetically opposed windings disposed on said toroidal core and respectively connected in the output circuits of said first and second electron tubes, and a third winding disposed on said toroidal magnetic core and coupled to the input circuit of said second electron tube, said first winding and said first electron tube being arranged to provide a greater magnetizing force in said toroidal magnetic core than said second winding and said second electron tube.

References Cited in the file of this patent

UNITED STATES PATENTS

| | | |
|---|---|---|
| 2,591,406 | Carter | Apr. 1, 1952 |
| 2,654,080 | Browne | Sept. 29, 1953 |
| 2,673,337 | Avery | Mar. 23, 1954 |